(12) United States Patent
Shijo et al.

(10) Patent No.: US 9,912,068 B2
(45) Date of Patent: Mar. 6, 2018

(54) ANTENNA APPARATUS AND RADAR APPARATUS

(71) Applicant: Kabushiki Kaisha Toshiba, Minato-ku (JP)

(72) Inventors: Tetsu Shijo, Tokyo (JP); Shuichi Obayashi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 508 days.

(21) Appl. No.: 14/613,675

(22) Filed: Feb. 4, 2015

(65) Prior Publication Data

US 2015/0222023 A1 Aug. 6, 2015

(30) Foreign Application Priority Data

Feb. 4, 2014 (JP) ................................. 2014-019748

(51) Int. Cl.
*H01Q 13/18* (2006.01)
*G01S 7/03* (2006.01)
(Continued)

(52) U.S. Cl.
CPC .............. *H01Q 13/18* (2013.01); *G01S 7/03* (2013.01); *G01S 13/4463* (2013.01); *G01S 13/931* (2013.01); *H01Q 13/22* (2013.01)

(58) Field of Classification Search
CPC .. H01Q 13/0233; H01Q 13/10; H01Q 13/103; H01Q 13/106; H01Q 13/18;
(Continued)

(56) References Cited

U.S. PATENT DOCUMENTS 3,243,818 A * 3/1966 Holtzman ............ H01Q 21/005
343/771
3,363,253 A * 1/1968 Ratkevich ............ H01Q 21/005
343/771
(Continued)

FOREIGN PATENT DOCUMENTS

JP 5-22025 A 1/1993
JP 10-32423 A 2/1998
(Continued)

OTHER PUBLICATIONS

J. Hirokawa, et al., "Reflection-Canceling Slot Pair Array with Cosecant Radiation Pattern using a Millimeter-Wave Post-Wall Waveguide", Institute of Electronics, Information, and Communication Engineers, 2000 IEICE Society Conference, B-1-16, 2000, 1 page.

(Continued)

*Primary Examiner* — Peter M Bythrow
(74) *Attorney, Agent, or Firm* — Oblon, McClelland, Maier & Neustadt, L.L.P.

(57) ABSTRACT

According to one embodiment, an antenna apparatus includes a waveguide is formed one or more first array elements and one or more second array element, each of the one or more first array elements being formed at a position where a coupling power ratio is no less than a threshold and including a first slot and at least one reflection suppressing element which suppresses a reflection from the first slot, each of the one or more second array elements being formed at a position where the coupling power ratio is less than the threshold and including a second slot and a third slot, the coupling power ratio indicating a ratio of an electric power supplied to each of the first and second array element to an electric power of electromagnetic wave radiated from the each of the first and second array element.

20 Claims, 11 Drawing Sheets

(51) Int. Cl.
*G01S 13/44* (2006.01)
*G01S 13/93* (2006.01)
*H01Q 13/22* (2006.01)

(58) Field of Classification Search
CPC .......... H01Q 13/22; H01Q 1/52; H01Q 1/521; H01Q 1/523
USPC .......................................................... 342/195
See application file for complete search history.

(56) References Cited

U.S. PATENT DOCUMENTS

| | | | | |
|---|---|---|---|---|
| 4,054,874 | A * | 10/1977 | Oltman, Jr. .......... | H01Q 9/0457 343/700 MS |
| 4,243,990 | A * | 1/1981 | Nemit .................... | H01Q 5/42 343/770 |
| 5,019,831 | A * | 5/1991 | Yee ................... | H01Q 21/0043 343/770 |
| 5,189,433 | A * | 2/1993 | Stern ....................... | H01Q 3/24 343/770 |
| 5,337,065 | A | 8/1994 | Bonnet et al. | |
| 5,349,364 | A * | 9/1994 | Bryanos .................... | H01P 5/12 333/116 |
| 5,638,079 | A * | 6/1997 | Kastner .................. | H01Q 13/22 343/768 |
| 5,726,666 | A * | 3/1998 | Hoover ................. | H01Q 13/22 343/767 |
| 5,757,329 | A * | 5/1998 | Hoover ................. | H01Q 13/18 29/600 |
| 5,977,924 | A * | 11/1999 | Takei ................... | H01Q 21/068 343/700 MS |
| 6,124,833 | A * | 9/2000 | Bialkowski ............ | H01Q 13/22 343/770 |
| 6,429,825 | B1 * | 8/2002 | Martek .................. | H01Q 13/18 343/770 |
| 6,489,930 | B2 * | 12/2002 | Teshirogi ........... | H01Q 21/068 333/238 |
| 8,441,405 | B2 * | 5/2013 | Tsutsumi ............... | H01P 5/107 333/26 |
| 8,665,142 | B2 * | 3/2014 | Shijo ......................... | G01S 7/03 342/175 |
| 8,957,818 | B2 * | 2/2015 | Chen ..................... | H01Q 13/22 343/768 |
| 9,287,614 | B2 * | 3/2016 | Vahidpour ............... | H01Q 1/36 |
| 2001/0028329 | A1 * | 10/2001 | Falk ..................... | H01Q 21/245 343/770 |
| 2005/0140556 | A1 * | 6/2005 | Ohno .................... | H01Q 13/20 343/770 |
| 2005/0162328 | A1 * | 7/2005 | Mori ........................ | H01Q 3/44 343/770 |
| 2006/0132374 | A1 * | 6/2006 | Wang .................... | H01Q 1/3275 343/770 |
| 2008/0266195 | A1 * | 10/2008 | Yamaguchi .......... | H01Q 21/005 343/771 |
| 2010/0001916 | A1 * | 1/2010 | Yamaguchi ............. | H01Q 13/12 343/771 |
| 2010/0225528 | A1 * | 9/2010 | Shijo .................... | G01S 13/4463 342/157 |
| 2010/0231440 | A1 * | 9/2010 | Shijo .................... | G01S 13/4463 342/195 |
| 2010/0321265 | A1 * | 12/2010 | Yamaguchi ............. | H01Q 13/22 343/771 |
| 2012/0056776 | A1 * | 3/2012 | Shijo ......................... | G01S 7/03 342/146 |
| 2012/0068900 | A1 * | 3/2012 | Yatabe ................... | H01Q 13/10 343/767 |

FOREIGN PATENT DOCUMENTS

| | | |
|---|---|---|
| JP | 2002-198728 A | 7/2002 |
| JP | 2003-318649 A | 11/2003 |
| JP | 3464107 B2 | 11/2003 |
| JP | 2005-217864 A | 8/2005 |
| JP | 2012-54869 A | 3/2012 |

OTHER PUBLICATIONS

Se-Hyun Park, et al., "Simple Analysis of a Slot and a Reflection-Canceling Post in a Rectangular Waveguide Using only the Axial Uniform Currents on the Post Surface", IEICE Trans. Commun., vol. E86-B, No. 8, ( Aug. 2003), pp. 2482-2487.

Kunio Sakakibara, et al., "A Linearly-Polarized Slotted Waveguide Array Using Reflection-Cancelling Slot Pairs", IEICE Trans. Commun., vol. E77-B, No. 4 , (Apr. 1994), pp. 511-518.

Notice of Allowance dated May 23, 2017 in Japanese Patent Application No. 2014-019748.

\* cited by examiner

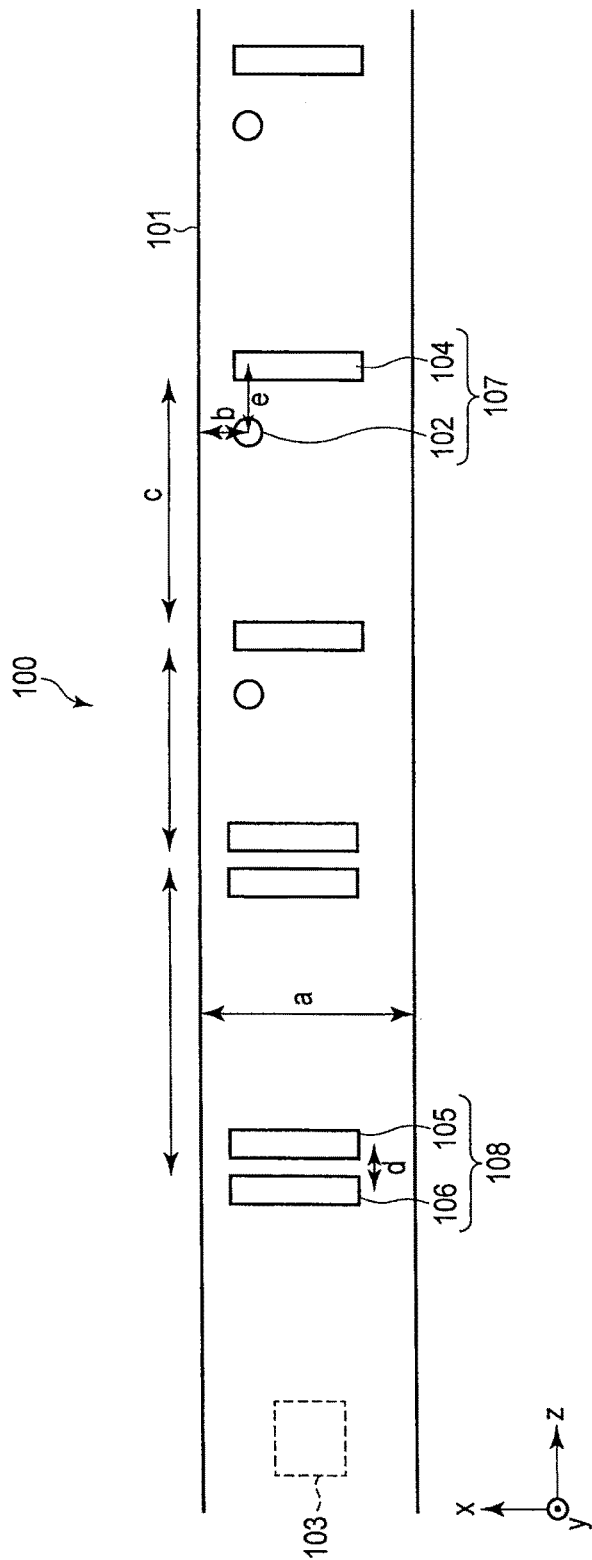
F I G. 1A

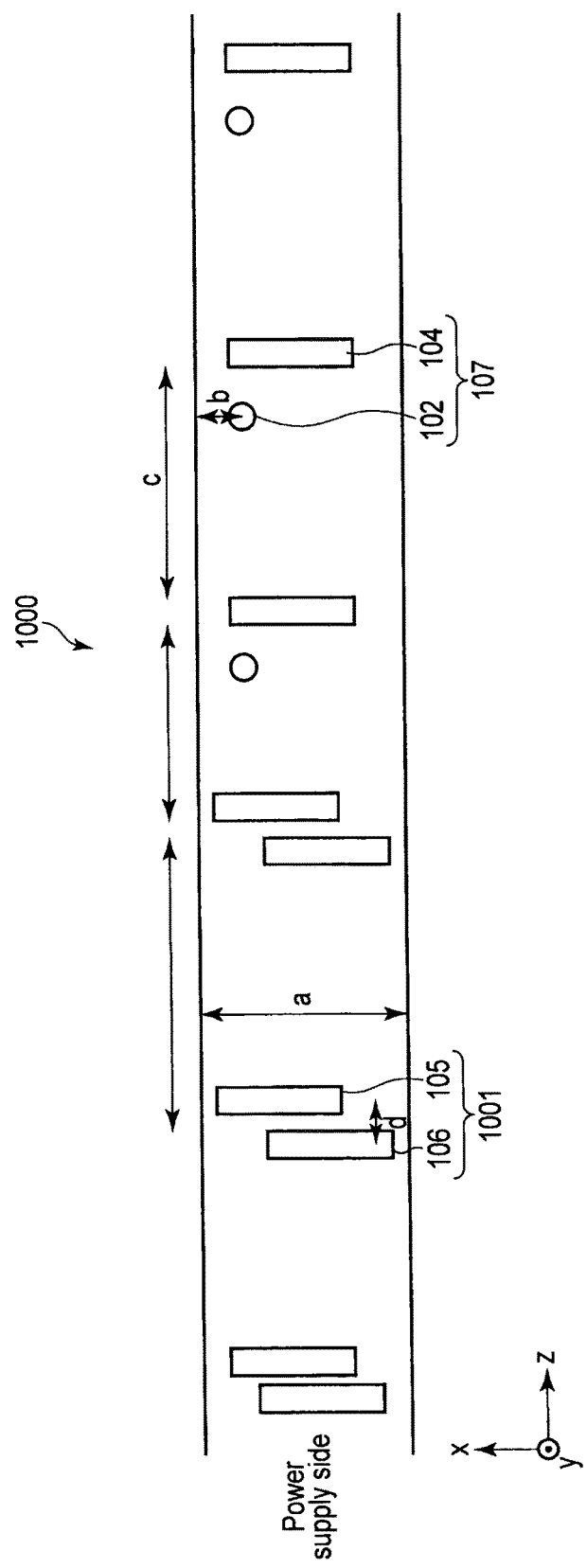
F I G. 10

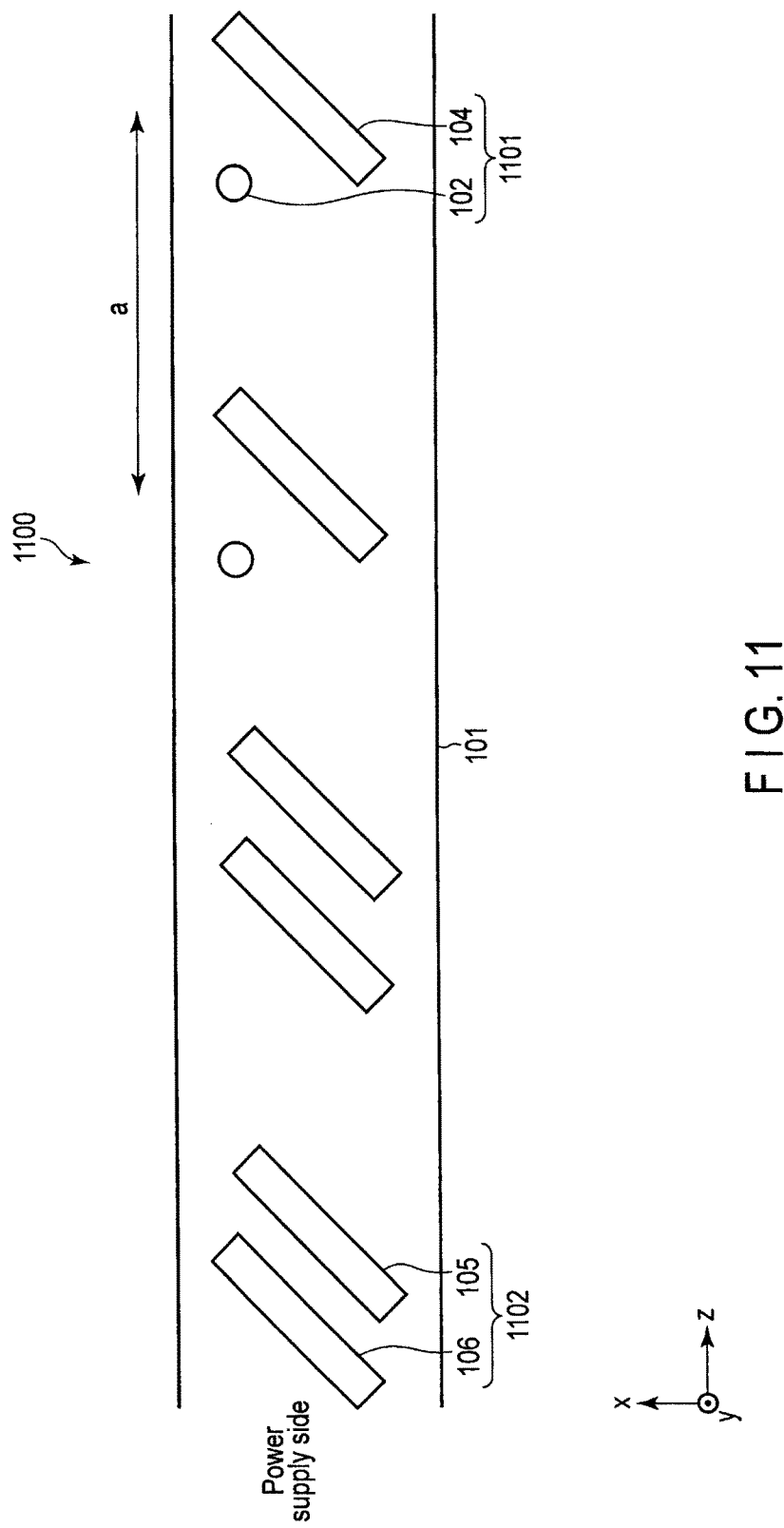
F I G. 11

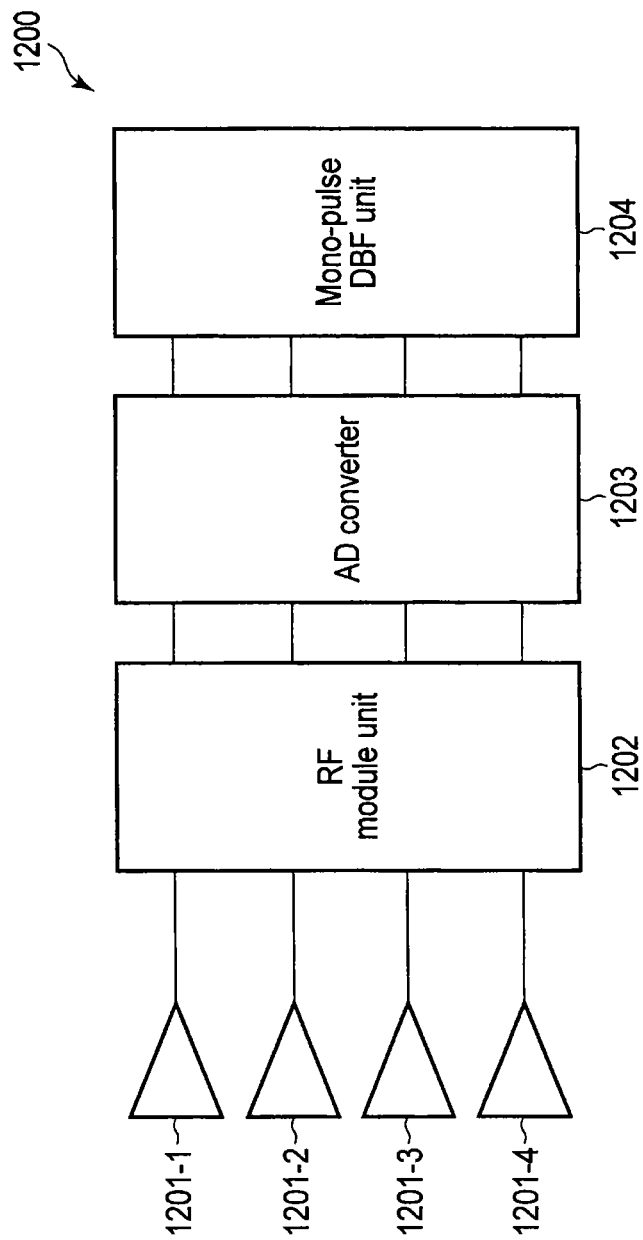
F I G. 12

ANTENNA APPARATUS AND RADAR APPARATUS

CROSS-REFERENCE TO RELATED APPLICATIONS

This application is based upon and claims the benefit of priority from Japanese Patent Application No. 2014-019748 filed Feb. 4, 2014, the entire contents of which are incorporated herein by reference.

FIELD

Embodiments described herein relate generally to an antenna apparatus and radar apparatus.

BACKGROUND

There is a waveguide slot array antenna in which a plurality of slots are formed in a waveguide, and electromagnetic waves are radiated from these slots.

When exciting the slots as radiating elements by propagating waves in this waveguide slot array antenna, it is necessary to suppress reflection from each radiating element. To suppress reflection from each slot, it is possible to arrange a post near the slot and cancel reflection from the slot by reflection from the post, or arrange a pair of two slots as one radiating element and cancel reflections from the two slots.

BRIEF DESCRIPTION OF THE DRAWINGS

FIG. 1A is a plan view illustrating an antenna apparatus according to the first embodiment;

FIG. 10 is a view illustrating an antenna apparatus according to the third modification;

FIG. 11 is a view illustrating an antenna apparatus according to the fourth modification; and FIG. 12 is a block diagram illustrating a radar apparatus according to the third embodiment.

DETAILED DESCRIPTION

Figure 1B:
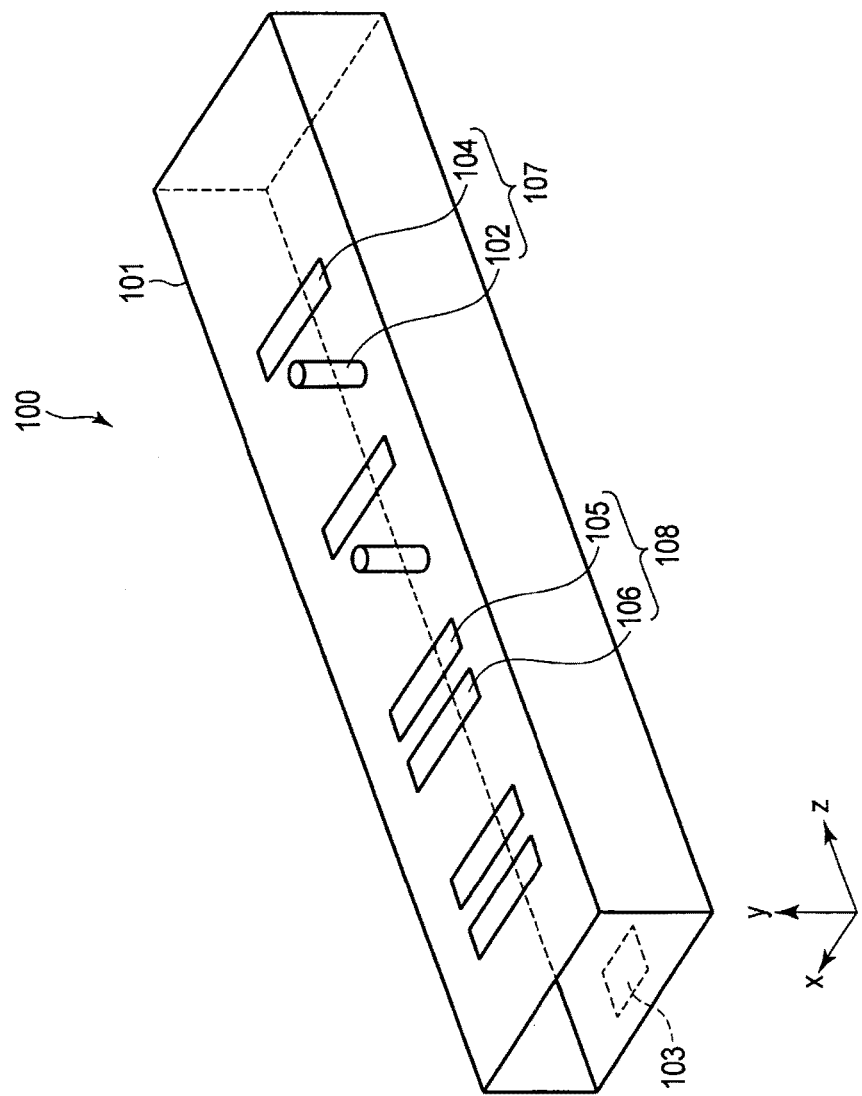
FIG. 1B is a perspective view illustrating the antenna apparatus according to the first embodiment.

Arranging a post for suppressing reflection in a waveguide poses the following problem. That is, in the array front stage of a waveguide slot array in which the coupling of an electromagnetic wave radiated from a slot is small, the reflection of the electromagnetic wave from the slot is small, and reflection from the post for canceling the reflection from the slot is also small. Consequently, the post is positioned close to the sidewall (also called the waveguide wall) from the center of the waveguide, so the wall of the waveguide and post physically interfere with each other.

Also, when suppressing reflection by a slot pair, if a radiation amount from each slot increases, the interval between slots forming the slot pair is decreased. Accordingly, in the array rear stage of the waveguide slot array in which the coupling of the electromagnetic wave radiated from each slot is large, the interval between the slots of the pair excessively decreases, or the slots must physically overlap each other. This makes it impossible to improve the reflections from the slots.

In general, according to one embodiment, an antenna apparatus includes a waveguide is formed one or more first array elements and one or more second array element, each of the one or more first array elements being formed at a position where a coupling power ratio is no less than a threshold and including a first slot and at least one reflection suppressing element which suppresses a reflection from the first slot, each of the one or more second array elements being formed at a position where the coupling power ratio is less than the threshold and including a second slot and a third slot, the coupling power ratio indicating a ratio of an electric power supplied to each of the first and second array element to an electric power of electromagnetic wave radiated from the each of the first and second array element.

An antenna apparatus and radar apparatus according to present embodiments will be explained in detail below with reference to the accompanying drawings. Note that in the following embodiments, parts denoted by the same reference numeral perform the same operation, and a repetitive explanation will be omitted.

The antenna apparatus according to this embodiment can be used for speed measurement and collision prevention of a train and automobile, and can also be used as an automotive radar for communication. Note that the antenna apparatus can also be used in other applications, in addition to these applications.

First Embodiment

An antenna apparatus according to the first embodiment will be explained with reference to FIGS. 1A and 1B. FIG. 1A is a plan view of an antenna apparatus 100 viewed in the y-axis direction. FIG. 1B is a perspective view of the antenna apparatus 100.

The antenna apparatus 100 according to the first embodiment includes a waveguide 101, reflection suppressing posts 102, and a power supply unit 103.

The waveguide 101 is a tube formed by a conductor and has a rectangular or circular section. Also, first, second, and third slots 104, 105, and 106 are formed in the waveguide 101 by forming holes in the surface of the waveguide 101. Practical formation positions of the first, second, and third slots 104, 105, and 106 will be described later with reference to FIGS. 3 and 4.

Note that a slot used as each of the first, second, and third slots 104, 105, and 106 can be either a longitudinal shunt slot formed parallel to a waveguide axis as the central axis of the waveguide, or a series slot formed perpendicularly to the axis of the waveguide. The slot may also be inclined to the waveguide axis. In this case, the slot functions as the longitudinal shunt slot or series slot.

The reflection suppressing post 102 is an element for suppressing reflection from the first slot 104 formed inside the waveguide 101 by using a conductor. The reflection suppressing post 102 can have a shape extending through the waveguide 101, or a shape which stops like a pile inside the waveguide 101 instead of extending through it. Note that the reflection suppressing post 102 is also called a reflection suppressing element.

The power supply unit 103 is a port connected to the waveguide 101 in order to supply electric power to it. Note that when electric power is supplied from the power supply unit 103, the waveguide 101 operates as a slot array antenna which radiates electromagnetic waves from a plurality of slots.

In the following explanation, the first slot 104 and reflection suppressing post 102 will be called a first array element 107 as a pair, and the second and third slots 105 and 106 will be called a second array element 108 as a pair.

Figure 2:
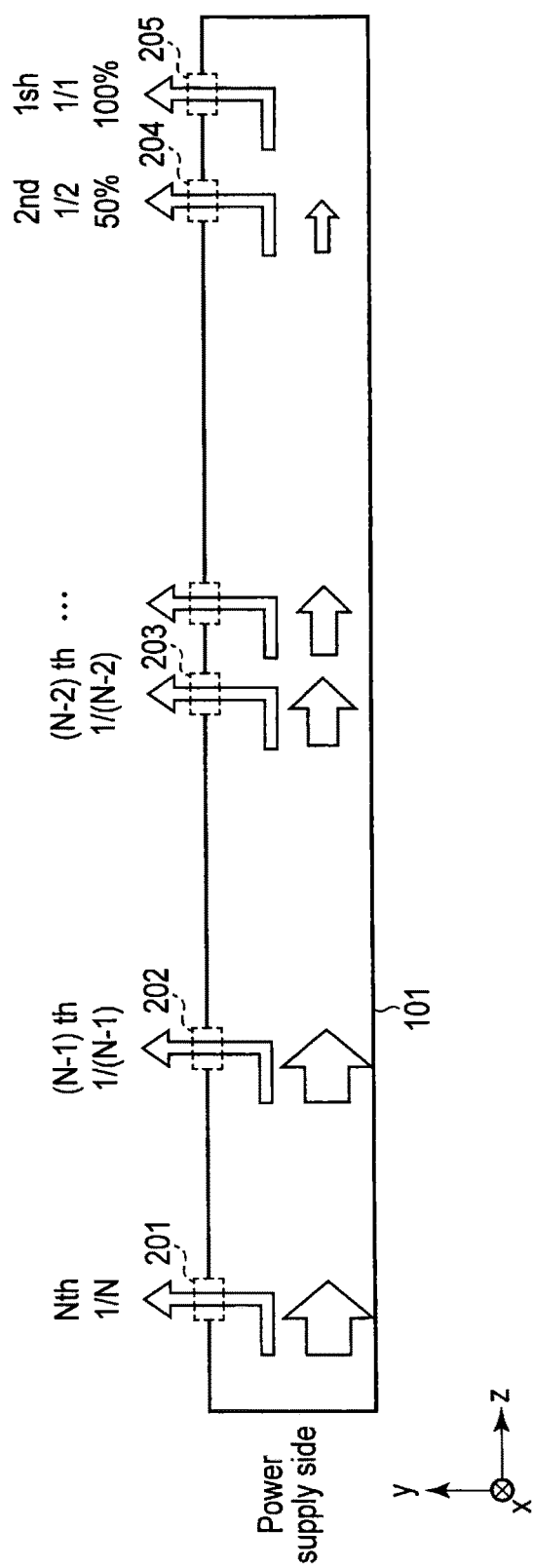
FIG. 2 is a conceptual view illustrating the operation principle of the antenna apparatus.

Next, the operation principle of the antenna apparatus 100 will be explained with reference to a conceptual view of FIG. 2.

A waveguide slot array antenna as the antenna apparatus 100 is classified into a standing wave excitation type which causes excitation by adjusting reflection from each array element at a power supply point, and a traveling wave excitation type which causes excitation by suppressing reflection in each array element. This embodiment adopts the operation principle of the traveling wave excitation type.

In a one-dimensional slot array including N elements (N is a positive integer of 5 or more), an Nth array element 201 closest to the power supply point radiates one Nth (a fraction will be represented as 1/N hereinafter) of electric power arriving at the Nth array element 201, and supplies the remaining (N−1)/N electric power to a subsequent (N−1)th array element 202. The (N−1)th array element 202 radiates 1/(N−1) of the electric power arriving at the (N−1)th array element 202, and supplies the remaining (N−2)/(N−1) electric power to a subsequent (N−2)th array element 203.

After power transfer is thus repeated, a second array element 204 in the rear stage of the waveguide finally radiates ½ of the electric power arriving at the second array element 204, and supplies ½ of the electric power to a first array element 205. The first array element 205 radiates the entire electric power arriving at the first array element 205.

By thus controlling the electric power radiated from each array element, the electric powers excited by all the array elements can be set at the uniform amplitude.

It is also possible to adjust the phase of an electromagnetic Wave radiated from each array element by an array interval as the interval between the array elements. To set the electromagnetic waves in phase, it is only necessary to form longitudinal shunt slots at a ½ guide wavelength interval, and form series slots at a guide wavelength interval.

A case in which the electric powers excited from all the array elements are set at the uniform amplitude and the electromagnetic waves excited from all the array elements are set in phase as described above is called a uniform excitation distribution, and the highest antenna gain can be obtained. Note that instead of this uniform excitation distribution, it is also possible to adopt another excitation distribution such as a Taylor distribution in order to reduce the sidelobe level by taking account of the antenna directivity.

Next, details of the first array element 107 will be explained with reference to FIG. 3.

Figure 3:
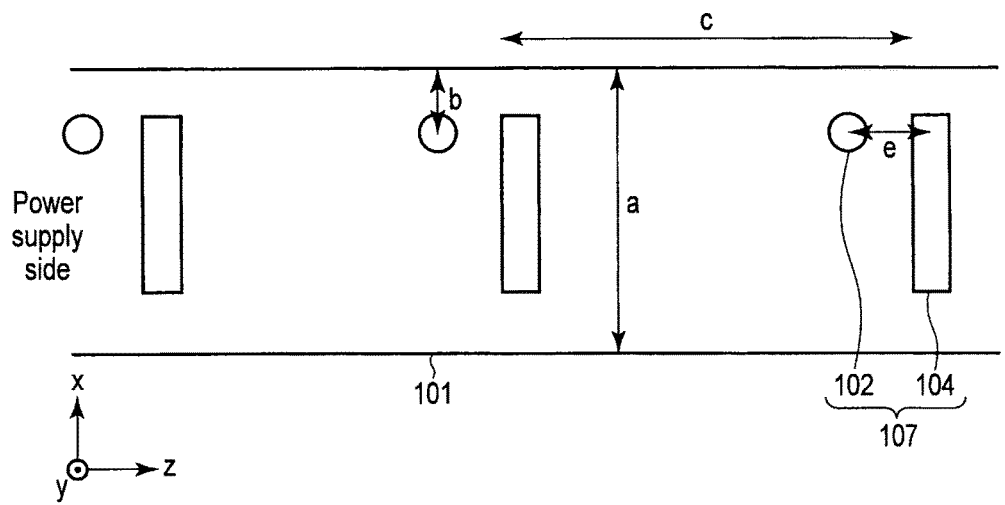
FIG. 3 is a view illustrating details of a first array element.

FIG. 3 is a plan view of the waveguide 101, which shows an example of the layout of the first slot 104 and reflection suppressing post 102 forming the first array element 107. The first slot 104 is formed in the surface of the waveguide 101 in accordance with a guide wavelength corresponding to the use frequency. With respect to the first slot 104, the reflection suppressing post 102 is arranged at a position where the reflection suppressing post 102 suppresses reflection from the first slot 104.

The reflection suppressing post 102 maximizes the reflection amount when arranged on the axis of the waveguide, and decreases the reflection amount as the arrangement position approaches the wall. Also, reflection from the slot increases as the coupling power ratio in the slot increases. The coupling power ratio is an amount indicating the ratio of electric power supplied to an array element to the electric power of an electromagnetic wave radiated from the array element. As practical arrangement positions, therefore, the reflection suppressing post 102 is arranged close to the axis of the waveguide 101 when the coupling power ratio in the first slot 104 is large, and arranged close to the wall of the waveguide 101 when the coupling power ratio in the first slot 104 is small.

Furthermore, an arrangement interval e between the first slot 104 and reflection suppressing post 102 can be set at about a one-quarter (¼) guide wavelength interval so as to cancel reflection from the first slot 104. In addition, FIG. 3 shows an example in which the reflection suppressing post 102 is arranged on the power supply side of the first slot 104, but the present embodiments are not limited to this, and the reflection suppressing post 102 may also be arranged on the other side of the first slot 104, which is opposite to the power supply side.

Details of the second array element 108 will now be explained with reference to FIG. 4.

Figure 4:
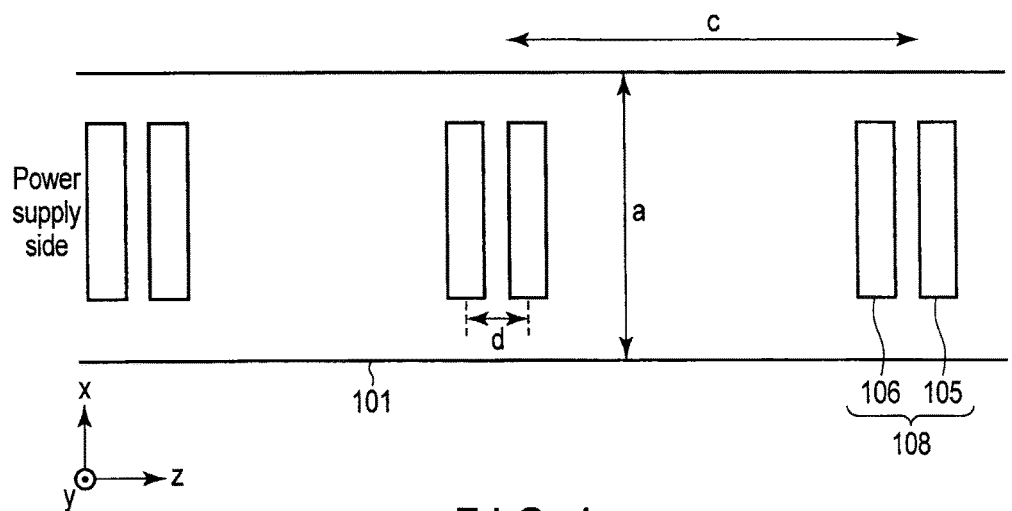
FIG. 4 is a view illustrating details of a second array element.

FIG. 4 is a plan view of the waveguide 101, which shows an example of the layout of the second and third slots 105 and 106 forming the second array element 108. As shown in FIG. 4, the second and third slots 105 and 106 are formed at a pair slot interval d in the axial direction of the waveguide. Although the second and third slots 105 and 106 are arranged parallel in FIG. 4, they need not be arranged parallel and may also be arranged to be, e.g., perpendicular to each other. The pair slot interval d need only be an interval at which reflections from the second and third slots 105 and 106 can be suppressed, e.g., about a ¼ guide wavelength interval. Also, the slot length of each of the second and third slots 105 and 106 is appropriately set, i.e., increased when the coupling power ratio of an electromagnetic wave radiated from the slot is large, and decreased when the coupling power ratio is small. The slot lengths of the second and third slots 105 and 106 are made slightly different in order to suppress reflections.

Next, the positions where the first and second array elements 107 and 108 are formed in the antenna apparatus 100 will be explained with reference to graphs shown in FIGS. 5 and 6.

First, the relationship between the distance from the reflection suppressing post 102 to the waveguide wall and the coupling power ratio in the first array element 107 will be explained with reference to the graph shown in FIG. 5.

Figure 5:
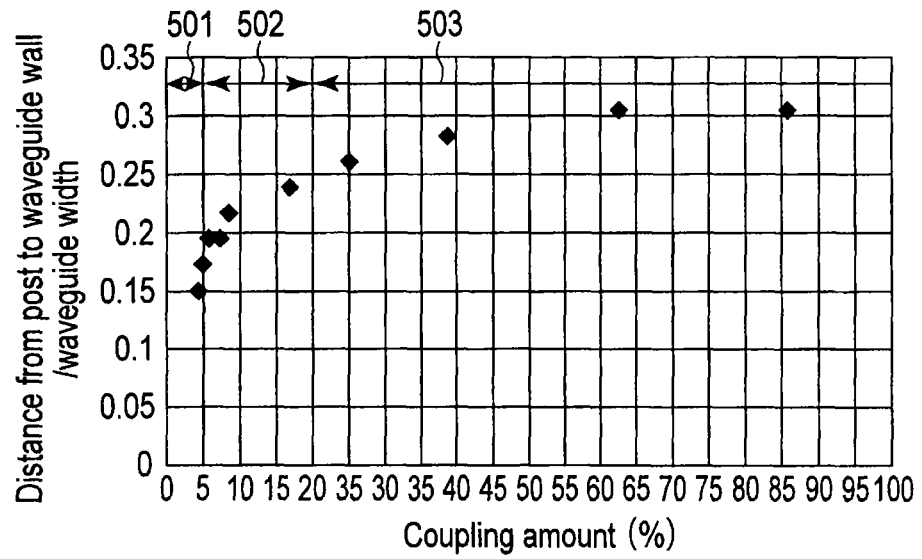
FIG. 5 is a graph illustrating the relationship between the distance to the waveguide wall and the coupling power ratio in the first array element.

In FIG. 5, the vertical axis indicates a value obtained by dividing a distance b from the reflection suppressing post 102 to the waveguide wall by a waveguide width a shown in FIG. 3, and the horizontal axis indicates the coupling power ratio in the first array element 107.

In a traveling wave excitation type waveguide slot array like the antenna apparatus 100 disclosed in the first embodiment, the coupling power ratio in the Nth array element is 1/N. In the uniform excitation distribution, the coupling power ratio in an array element closest to the power supply unit 103 is smallest, and the coupling power ratio in an array element positioned in the terminal end farthest from the power supply unit 103 is 100%. As shown in FIG. 5, therefore, the distance from the reflection suppressing post 102 to the waveguide wall shortens as the coupling power ratio decreases. That is, in an array element having a small coupling power ratio, the reflection suppressing post 102 and waveguide wall are too close to each other and physically interfere with each other.

The relationship between the pair slot interval and coupling power ratio in the second array element 108 will now be explained with reference to the graph shown in FIG. 6.

Figure 6:
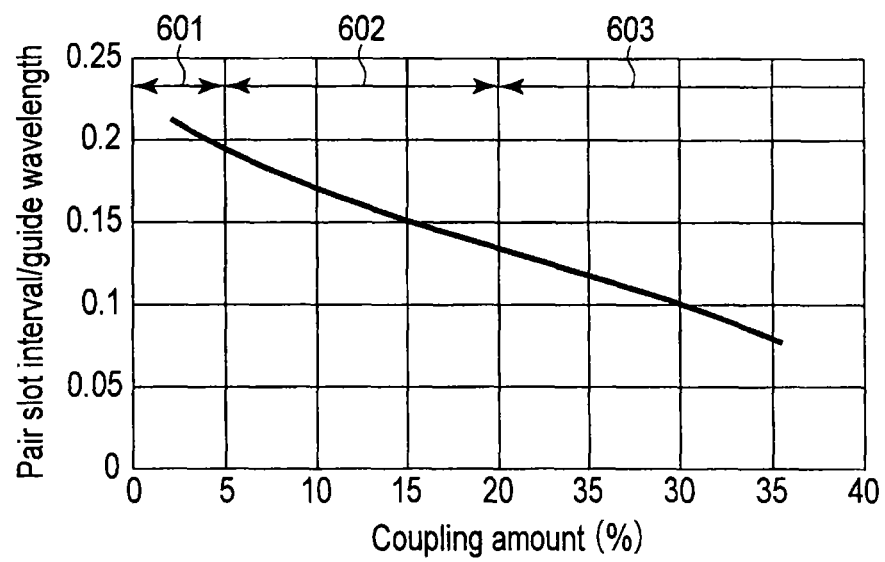
FIG. 6 is a graph illustrating the relationship between the pair slot interval and the coupling power ratio in the second array element.

In FIG. 6, the vertical axis indicates a value obtained by dividing the pair slot interval d by the waveguide width a of the waveguide 101, and the horizontal axis indicates the coupling power ratio in the second array element 108.

As shown in FIG. 6, the pair slot interval d is about a ¼ guide wavelength interval when the coupling power ratio in the second array element 108 is small, but shortens as the coupling power ratio in the second array element 108 increases. When the coupling power ratio in the second array element 108 is large, the second and third slots 105 and 106 physically interfere with each other because reflections can no longer be suppressed unless the slot interval becomes smaller than the slot width.

From the foregoing, the second array element 108 is used at a position where the coupling power ratio in the array element is smaller than a threshold, and the first array element 107 is used at a position where the coupling power ratio in the array element is equal to or larger than the threshold. Consequently, the antenna characteristics can be improved because no physical interference of the slots or the reflection suppressing post occurs due to the coupling power ratio. More specifically, with reference to, e.g., FIGS. 5 and 6, the second array element 108 can be formed at positions (coupling power ratio ranges 501 and 601) where the coupling power ratio is less than 5%, and the first array element 107 can be formed at positions (coupling power ratio ranges 502, 503, 602, and 603) where the coupling power ratio is 5% or more.

Note that it is also possible to set two steps of thresholds (a first threshold<a second threshold). In this case, either the first array element 107 or second array element 108 can be formed when the coupling power ratio is equal to or larger than the first threshold and smaller than the second threshold.

More specifically, it is possible to form, e.g., the second array element 108 at positions (the coupling power ratio ranges 501 and 601) where the coupling power ratio is less than 5%, form one of the first and second array elements 107 and 108 at positions (the coupling power ratio ranges 502 and 602) where the coupling power ratio is 5% (inclusive) to 20% (exclusive), and form the first array element 107 at positions (the coupling power ratio ranges 503 and 603) whether the coupling power ratio is 20% or more. In this arrangement, the first and second array elements 107 and 108 do not physically interfere with each other, so reflections can be appropriately suppressed.

Note that in the uniform excitation distribution, the coupling power ratio in an array element close to the power supply point is small, and that in an array element close to the end point is large. Accordingly, the first array element 107 is formed as an array element formed at a position far from the power supply unit 103, and the second array element 108 is formed as an array element formed at a position close to the power supply point. Also, the coupling power ratio at a position far from the power supply unit 103 can sometimes be smaller than that at a position close to the power supply unit 103, depending on the excitation distribution. In this case, it is possible to form the first array element 107 at the position close to the power supply point, and form the second array element 108 at the position far from the power supply point.

Furthermore, an interval c between adjacent arrays shown in FIGS. 3 and 4, i.e., the interval c between the first array elements 107 adjacent to each other, between the second array elements 108 adjacent to each other, or between the first and second array elements 107 and 108 adjacent to each other is desirably a guide wavelength interval in order to cause uniform excitation. Note that it is also possible to appropriately change the interval c by another excitation distribution.

According to the first embodiment described above, the second array element is formed at a position where the coupling power ratio in the array element is less than the threshold, and the first array element is formed at a position where the coupling power ratio in the array element is equal to or larger than the threshold. This makes it possible to appropriately suppress reflection from the array element independently of the coupling power ratio in the array element, and improve the antenna characteristics.

Second Embodiment

The second embodiment differs from the first embodiment in that an antenna apparatus is formed by using a substrate-integrated waveguide which includes conductor layers and via holes formed in the upper and lower surfaces of a dielectric substrate, and in which a via hole array is used as the wall of the waveguide.

Figure 7:
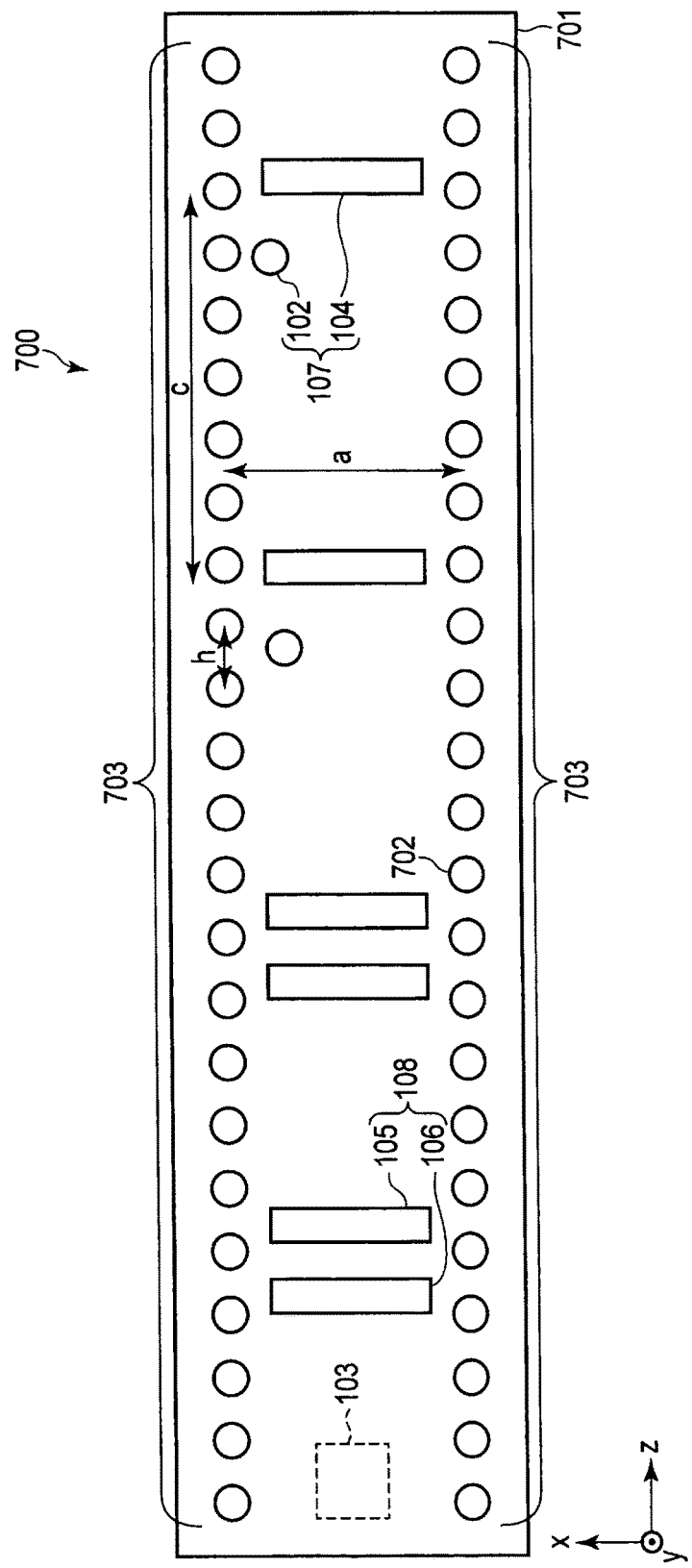
FIG. 7 is a view illustrating an antenna apparatus according to the second embodiment.

The antenna apparatus according to the second embodiment will be explained with reference to FIG. 7.

An antenna apparatus 700 according to the second embodiment includes a dielectric substrate 701 and via holes 702.

The dielectric substrate 701 need only be a general dielectric substrate. An example is a substrate obtained by covering the two surfaces of a dielectric material such as Teflon® with a conductor such as copper foil.

The via holes 702 are formed by electroplating a conductor in holes extending through the dielectric substrate 701, e.g., by plating the inner walls of the holes. The via holes 702 electrically connect a conductor of a first surface the dielectric substrate 701 and a conductor of a second surface opposing the first surface of the dielectric substrate 701. Also, a via hole array 703 is formed by arranging a plurality of via holes 702 at a first spacing, and two via hole arrays 703 are formed parallel at a second spacing. The via hole arrays 703 thus function as the walls of the waveguide, and allow the antenna apparatus 700 to operate as a substrate-integrated waveguide, which is a pseudo waveguide. That is, the second spacing is a waveguide width a of the waveguide. Note that the first spacing of the via holes forming the post wall, i.e., a distance h of the centers of adjacent via holes 702 forming the via hole array 703 can be about twice the diameter of the via hole 702. Note also that the spacing may also be narrowed in order to reduce a leakage electromagnetic wave from the gap between the via holes 702.

Furthermore, in a conductor region on the first surface sandwiched between the two via hole arrays 703 at the second spacing, a first array element 107 is formed at a position where the coupling power ratio of the array element is equal to or larger than a threshold, and a second array element 108 is formed at a position where the coupling power ratio of the array element is less than the threshold, in the same manner as in the first embodiment.

First, second, and third slots 104, 105, and 106 can be formed by cutting the conductor on the surface of the dielectric substrate 701 into a rectangular shape. A reflection suppressing post 102 can be formed in the same manner as that for the via hole 702.

According to the second embodiment described above, the second array element is formed at a position where the coupling power ratio is less than the threshold, and the first array element is formed at a position where the coupling power ratio is equal to or larger than the threshold, by using the substrate-integrated waveguide in which the via holes are formed in the dielectric substrate. Accordingly, the antenna apparatus can operate as a substrate-integrated waveguide slot array antenna. As in the first embodiment, therefore, it is possible to suppress reflection of the array element regardless of the coupling power ratio in the array element, and improve the antenna characteristics.

Modifications of First and Second Embodiments

Modifications of the first and second embodiments will be explained below with reference to FIGS. 8 to 11. Note that the antenna apparatus 100 according to the first embodiment is assumed to be used in FIGS. 8 to 11, but the modifications are similarly applicable to the antenna apparatus 700 using the substrate-integrated waveguide according to the second embodiment.

Figure 8:
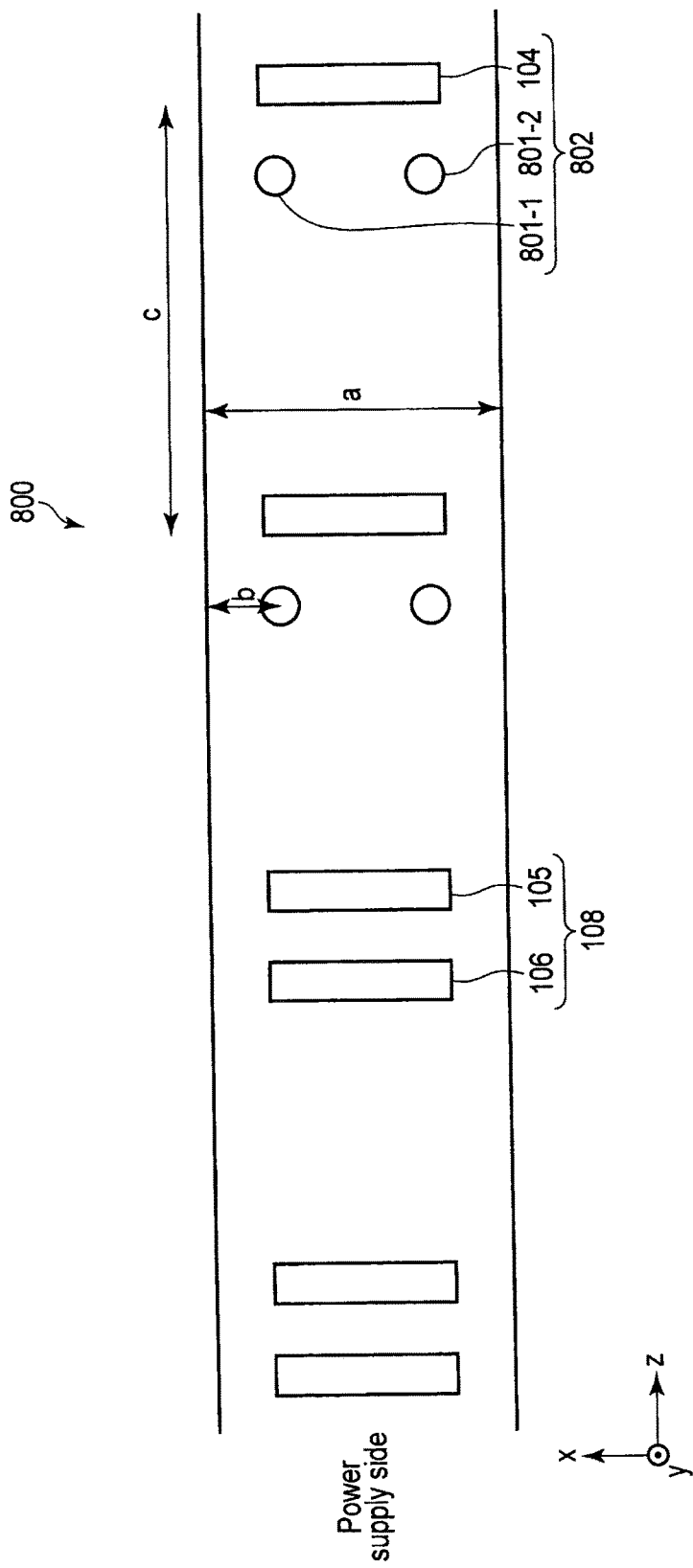
FIG. 8 is a view illustrating an antenna apparatus according to the first modification.

FIG. 8 shows the first modification of the antenna apparatus.

In an antenna apparatus 800 according to the first modification, a first array element 802 including two reflection suppressing posts 801-1 and 801-2 is formed. Note that the number of posts is not limited to two and may also be three or more. Note also that the reflection suppressing posts 801-1 and 801-2 are formed on the power supply side in this example shown in FIG. 8. However, the present embodiments are not limited to this, and the reflection suppressing posts 801-1 and 801-2 may also be arranged on the other side of the first slot 104, which is opposite to the power supply side.

Figure 9:
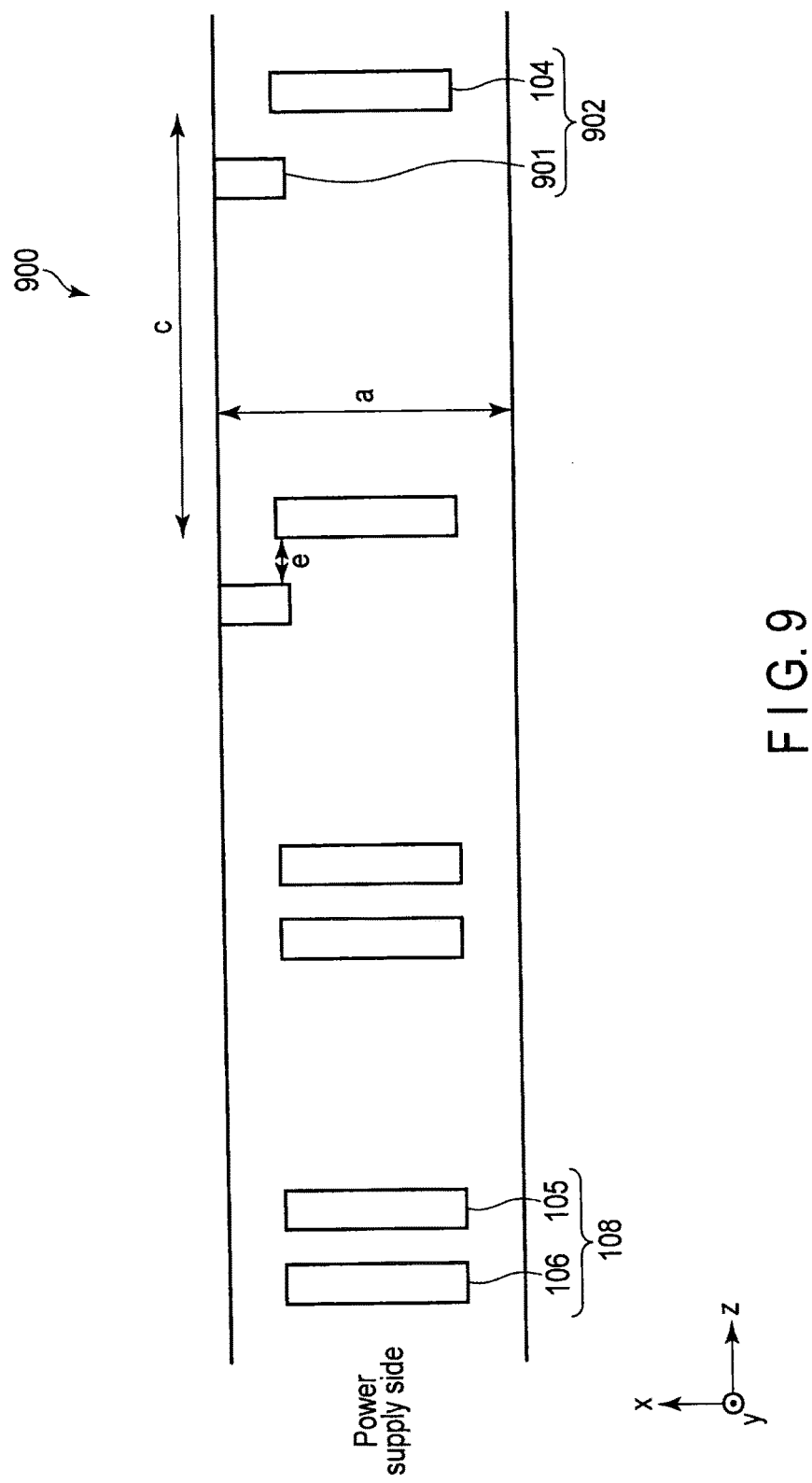
FIG. 9 is a view illustrating an antenna apparatus according to the second modification.

FIG. 9 shows the second modification of the antenna apparatus.

In an antenna apparatus 900 according to the second modification, a reflection suppressing wall 901 is used as a reflection suppressing element instead of the reflection suppressing post 102, and a first array element 902 including the reflection suppressing wall 901 and first slot 104 is formed. Thus, a reflection suppressing element may also have a structure such as the reflection suppressing wall 901 integrated with the wall of the waveguide. Note that when using the reflection suppressing post, reflection is suppressed by forming the post close to the axis of the waveguide when the coupling power ratio of the array element is large. When using the reflection suppressing wall 901, however, reflection can be suppressed by increasing the length of the reflection suppressing wall 901 in a direction perpendicular to the waveguide axis.

FIG. 10 shows the third modification of the antenna apparatus.

In an antenna apparatus 1000 according to the third embodiment, a second array element 1001 is formed in a state in which the second and third slots 105 and 106 are shifted (offset) from each other in the waveguide widthwise direction. The second array element can be formed by using even the offset slots as described above.

FIG. 11 shows the fourth modification of the antenna apparatus.

In an antenna apparatus 1100 according to the fourth embodiment, first, second, and third slots 104, 105, and 106 are formed obliquely to the waveguide axial direction. In this manner, the first slot 104 and reflection suppressing post 102 form a first array element 1101, and the second and third slots 105 and 106 form a second array element 1102. Since each slot is obliquely formed to make an angle of 45° with the waveguide axial direction in FIG. 11, a 45° polarized wave can be controlled.

According to the modifications of the first and second embodiments described above, the modifications can improve the antenna characteristics in the same manner as in the above-described embodiments.

Third Embodiment

A radar apparatus including the antenna apparatus according to the above-described embodiments and modifications will be explained.

This radar apparatus according to the third embodiment will be explained with reference to a block diagram shown in FIG. 12.

A radar apparatus 1200 according to the third embodiment includes antennas 1201-1, 1201-2, 1201-3, and 1201-4 (referred to as an antenna unit), an RF module unit 1202, an AD (Analog-to-Digital) converter 1203, and a mono-pulse DBF (Digital Beam Forming) unit 1204.

The antennas 1201-1, 1201-2, 1201-3, and 1201-4 as antenna apparatuses can be formed by using any of the antenna apparatuses according to the above-described embodiments.

The RF module unit 1202 receives signals from the antennas 1201-1, 1201-2, 1201-3, and 1201-4, and performs processing including down-conversion by which converted signals are obtained by performing frequency conversion on the received signals.

The AD converter 1203 receives the converted signals from the RF module unit 1202, and generates digital signals by performing analog-to-digital conversion on the converted signals.

The mono-pulse DBF unit 1204 receives the digital signals from the AD converter 1203, and estimates a beam arriving direction (a position of a target) by using the digital signals. A detailed explanation of the operation will be omitted because well-known techniques are used.

According to the third embodiment described above, the antenna efficiency is high because the antenna apparatuses of the above-described embodiments are used. As a consequence, the detection range of the radar apparatus can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An antenna apparatus, comprising
 a waveguide formed one or more first array elements and one or more second array elements, each of the one or more first array elements being formed at a position where a coupling power ratio is no less than a threshold and including a first slot and at least one reflection suppressing element which suppresses a reflection from the first slot, each of the one or more second array elements being formed at a position where the coupling power ratio is less than the threshold and including a second slot and a third slot, the coupling power ratio indicating a ratio of an electric power supplied to each of the first and second array element to an electric power of electromagnetic wave radiated from the each of the first and second array element.

2. The apparatus according to claim 1, wherein the waveguide comprises:
a dielectric substrate including a first surface and a second surface opposing the first surface, the first surface being covered with a first conductor, the second surface being covered with a second conductor;
a first via hole array formed by arranging, at a first spacing, a plurality of first via holes which electrically connect the first conductor and the second conductor; and
a second via hole array formed by arranging, at the first spacing, a plurality of second via holes which electrically connect the first conductor and the second conductor, the second via hole array being arranged parallel to the first via hole array at a second spacing,
the one or more first array elements are formed at a position where the coupling power ratio is no less than the threshold in a region on the first surface sandwiched between the first via hole array and the second via hole array, and the one or more second array elements are formed at a position where the coupling power ratio is less than the threshold in the region.

3. The apparatus according to claim 1, wherein when setting a first threshold and a second threshold larger than the first threshold, the one or more second array elements are formed at a position where the coupling power ratio is less than the second threshold, the one or more first array elements are formed at a position where the coupling power ratio is no less than the first threshold, and at least one of the first and second array elements are formed at a position where the coupling power ratio is no less than the first threshold and less than the second threshold.

4. The apparatus according to claim 3, wherein the first threshold is five percent and the second threshold is twenty percent.

5. The apparatus according to claim 1, further comprising a power supplier configured to supply electric power to the waveguide.

6. The apparatus according to claim 5, wherein one of the second array elements is formed at apposition which is closer to the power supplier than a position at which one of the first array elements is formed.

7. The apparatus according to claim 1, wherein when a total number of the first array elements is more than one, and a total number of the second array elements is more than one, a first interval, a second interval and a third interval are each set at a guide wavelength interval, the first interval being an interval between the first array elements adjacent to each other, the second interval being an interval between the second array elements adjacent to each other, the third interval being an interval between one of the first array elements and one of the second array elements adjacent to each other.

8. The apparatus according to claim 1, wherein the first slot and the at least one reflection suppressing element are formed at an interval no more than a one-quarter guide wavelength in a longitudinal direction of the waveguide, and the second slot and the third slot are formed at an interval no more than the one-quarter guide wavelength in the longitudinal direction of the waveguide.

9. The apparatus according to claim 1, wherein the second slot and the third slot are formed as a pair slot.

10. The apparatus according to claim 1, wherein the second slot and the third slot are formed at an interval so that reflections from each other's slot are suppressed.

11. The apparatus according to claim 1, wherein the third slot is formed at a position which is closer to the second slot than the first slot.

12. The apparatus according to claim 1, wherein the electric powers excited by all of the first and second array elements is set at a uniform amplitude.

13. The apparatus according to claim 1, wherein the reflection suppressing element is a reflection suppressing post formed of conductor and inside the waveguide.

14. The apparatus according to claim 1, wherein the reflection suppressing element is a reflection suppressing wall integrated with the wall of the waveguide.

15. The apparatus according to claim 1, wherein the second slot and the third slot are offset from each other.

16. The apparatus according to claim 1, wherein the first, second, and third slots are formed obliquely to the longitudinal direction of the waveguide.

17. A radar apparatus, comprising:
a plurality of the antenna apparatus of claim 1;
an RF module configured to perform processing including a down conversion which obtains a converted signal by performing frequency conversion on a signal received by the antenna unit;
an AD converter configured to generate a digital signal by performing an analog to digital conversion on the converted signal; and
a mono pulse digital beam former configured to estimate a position of a target by using the digital signal.

18. The apparatus according to claim 17, wherein the waveguide comprises:
a dielectric substrate including a first surface and a second surface opposing the first surface, the first surface being covered with a first conductor, the second surface being covered with a second conductor;
a first via hole array formed by arranging, at a first spacing, a plurality of first via holes which electrically connect the first conductor and the second conductor; and
a second via hole array formed by arranging, at the first spacing, a plurality of second via holes which electrically connect the first conductor and the second conductor, the second via hole array being arranged parallel to the first via hole array at a second spacing,
the one or more first array elements are formed at a position where the coupling power ratio is no less than the threshold in a region on the first surface sandwiched between the first via hole array and the second via hole array, and the one or more second array elements are formed at a position where the coupling power ratio is less than the threshold in the region.

19. The apparatus according to claim 17, wherein when setting a first threshold and a second threshold larger than the first threshold, the one or more second array elements are formed at a position where the coupling power ratio is less than the second threshold, the one or more first array elements are formed at a position where the coupling power ratio is no less than the first threshold, and at least one of the first and second array elements are formed at a position where the coupling power ratio is no less than the first threshold and less than the second threshold.

20. The apparatus according to claim 19, wherein the first threshold is five percent and the second threshold is twenty percent.

* * * * *